US006473732B1

(12) United States Patent
Chen

(10) Patent No.: US 6,473,732 B1
(45) Date of Patent: Oct. 29, 2002

(54) SIGNAL ANALYZER AND METHOD THEREOF

(75) Inventor: Weizhong Chen, North Richland Hills, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/544,908

(22) Filed: Oct. 18, 1995

(51) Int. Cl.[7] ............................ G10L 21/00; H04B 1/38

(52) U.S. Cl. ........................ 704/205; 704/211; 375/340

(58) Field of Search ................................ 395/2.14, 2.2, 395/2.12, 2.15; 364/724.16, 726; 704/205, 211, 203, 206; 375/224, 340, 260; 708/400, 402, 403; 702/66, 75

(56) References Cited

U.S. PATENT DOCUMENTS

| | | | | | |
|---|---|---|---|---|---|
| 4,926,472 | A | * | 5/1990 | Batruni et al. | 379/411 |
| 5,204,827 | A | * | 4/1993 | Fujita et al. | 364/724.1 |
| 5,280,255 | A | * | 1/1994 | Nishikawa et al. | 364/724.16 |
| 5,392,230 | A | * | 2/1995 | Christopher | 364/724.16 |
| 5,491,518 | A | * | 2/1996 | Kim | 375/233 |
| 5,535,240 | A | * | 7/1996 | Carney et al. | 375/219 |
| 5,537,435 | A | * | 7/1996 | Carney et al. | 375/219 |
| 5,576,978 | A | * | 11/1996 | Kitayoshi | 364/576 |
| 5,606,575 | A | * | 2/1997 | Williams | 375/219 |

OTHER PUBLICATIONS

Chen, Weizhong et al., ICSPAT '94, Dallas, Texas, Oct. 18–21, 1994, An Efficient Recursive Time–Varying Fourier Transform By Using A Half–Sine Wave Window, pp. 284–286.

Chen, Weizhong et al., IEEE–SP International Symposium, Philadelphia, PA, Oct. 25–28, 1994, "Time Frequency and Time–Scale Analysis", pp. 461–466.

Amin, Moeness G. et al., IEEE, vol. 75, No. 5, May 1987, "On the Application of the Single–Pole Filter in Recursive Power Spectrum Estimation", pp. 729–730.

Amin, Moeness G., IEEE, vol. 75, No. 11, Nov. 1987, "A New Approach to Recursive Fourier Transform", pp. 1537–1538.

Amin, Moeness G. et al., IEEE, vol. 76, No. 3, Mar. 1988, "Order–Recursive Spectrum Estimation", pp. 289–290.

Barnwell, Thomas P., School of Electrical Engineering Georgia Institute of Technology, Atlanta, Georgia 30332, Before 1980, pp. 1–4.

Chen, W. et al., IEEE, vol. 41, No. 7, Jul. 1993, "An Efficient Recursive Algorithm for Time–Varying Fourier Transform", pp. 2488–2490.

Riedel, Kurt S., IEEE, vol. 43, No. 1, Jan. 1995, "Minimum Bias Multiple Taper Spectral Estimation", pp. 188–195.

Unser, Michael, EPFL, 16 ch. de Bellerive, CH–1007 Lausanne, Switzerland, Sep. 27, 1982, "Recursion In Short–Time Signal Analysis", pp. 229–240.

Unser, Michael, IEEE, vol. 76, No. 10, Oct. 1988, "Comments on 'A New Approach to Recursive Fourier Transform", pp. 1395–1396.

* cited by examiner

*Primary Examiner*—Patrick N. Edouard
(74) *Attorney, Agent, or Firm*—Charles W. Bethards; Matthew C. Loppnow

(57) ABSTRACT

A signal analyzer (303) and method thereof using short-time signal analysis, preferably recursive, to obtain a time variant feature from a signal, the signal analyzer including a signal sampler (401) with an input register (403) for storing a sequence of samples of the signal, a multiplier (405) for weighting in accordance with, alternatively, a half-sine, cosine, 2nd order complex pole, or 3rd order complex pole function the sequence of samples to provide weighted samples of the signal, and a combiner (407) for combining the weighted samples to provide a signal feature estimate, such as a signal average or frequency dependent energy estimate, for the signal.

54 Claims, 8 Drawing Sheets

207

303

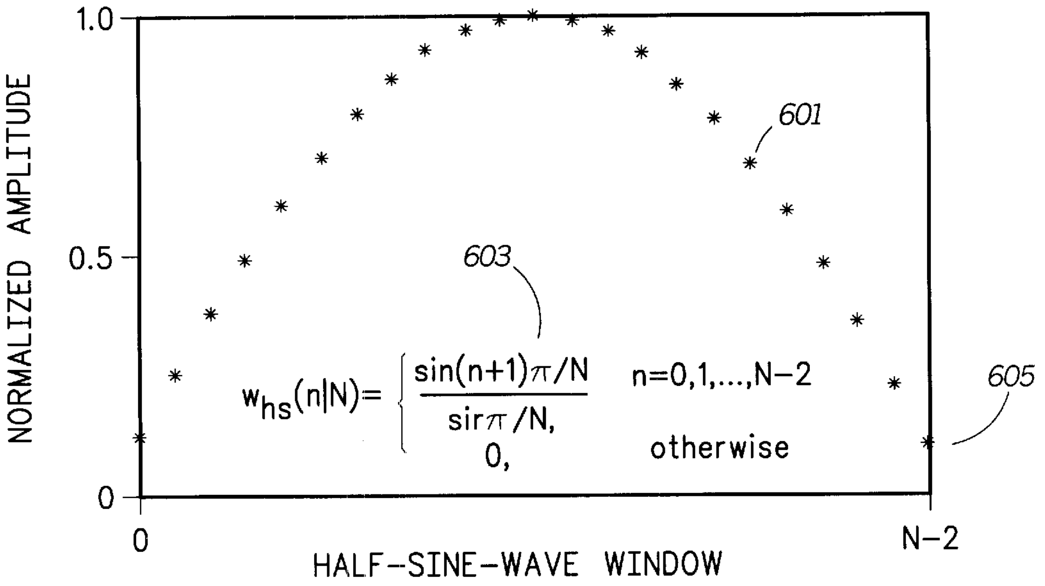
FIG. 6.1
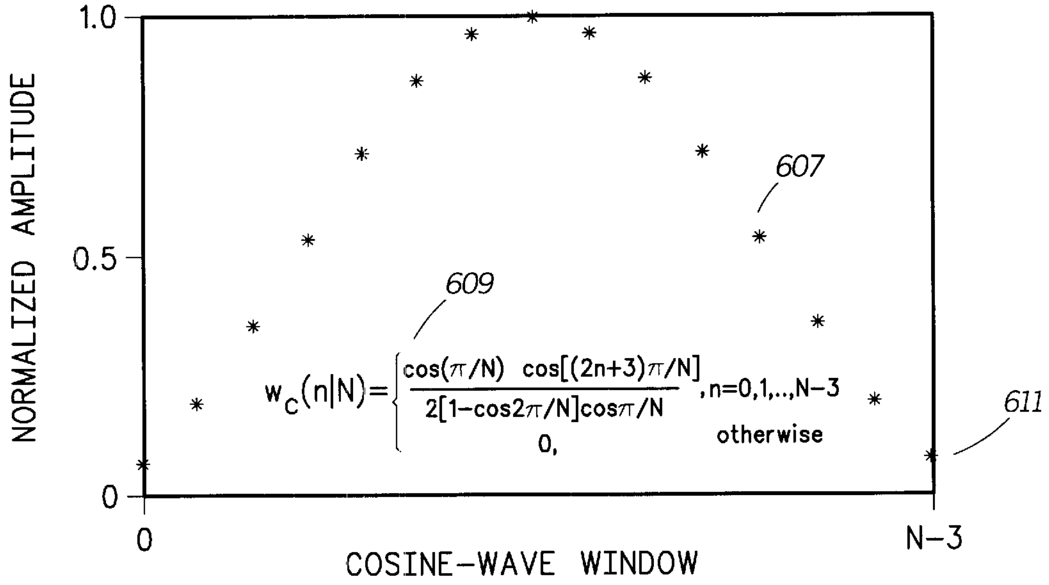
FIG. 6.2

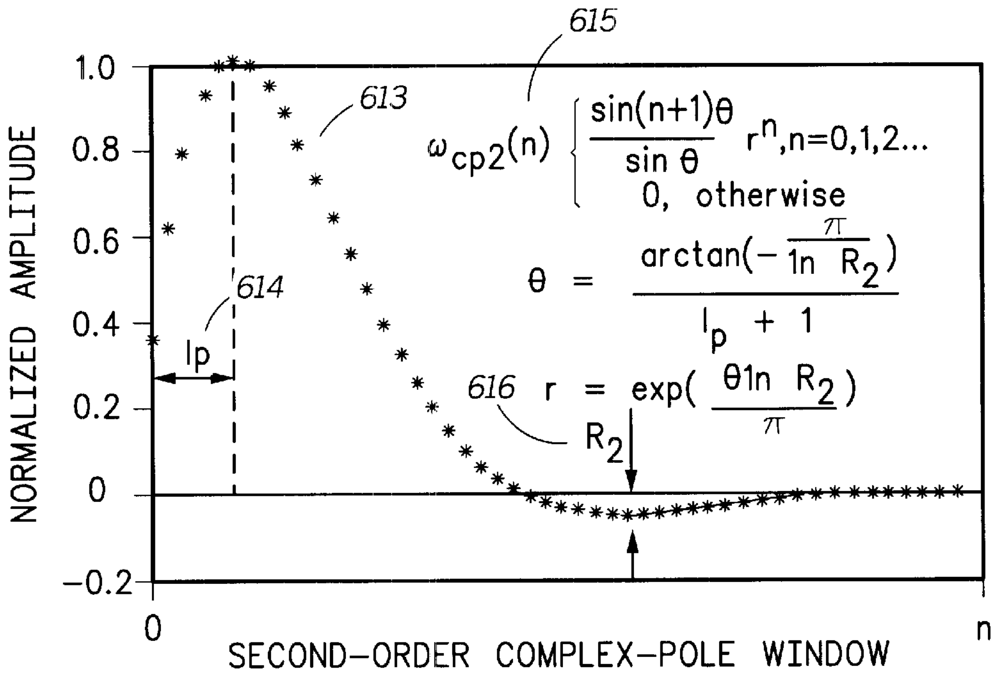
*FIG. 6.3*
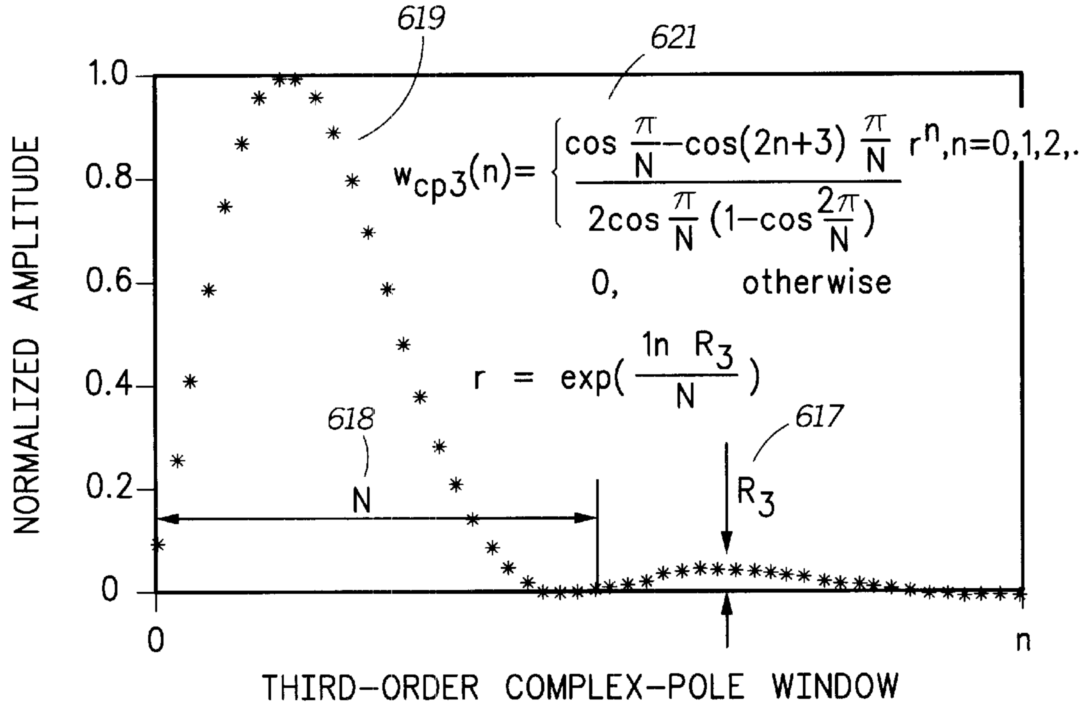
*FIG. 6.4*

SIGNAL ANALYZER AND METHOD THEREOF

FIELD OF THE INVENTION

The present disclosure deals with wireless receivers including demodulators using signal analyzers, methods thereof, and applications of each. This disclosure deals more specifically with but not limited to such apparatus and methods employing short-time signal analysis including recursive structures and methods of such analysis.

BACKGROUND OF THE INVENTION

Wireless receivers including demodulators using signal analyzers and signal analysis are known. That notwithstanding, practitioners in the field continue to devote extensive attention to the topic, perhaps due to it's relative significance as nearly all electronic or other systems require some signal analysis. The general form and concept of short-time signal analysis, although more recently developed, is similarly known.

Short-time signal analysis is a tool especially suitable for adaptive estimation. Adaptive estimation estimates time varying features of non-stationary signals or systems by using a window to localize and weight data and then applying stationary estimation to the localized data to generate a local estimate or signal feature. Short time signal analysis is useful for various forms of adaptive signal processing, such as adaptive filtering, time/frequency analysis, time scale analysis, filter bank design, etc. Recursive short-time signal analysis is a method of implementing short-time signal analysis that relies on previous estimates of a local feature to estimate the local feature for a new time. Apparatus and methods suitable for accurate and efficient implementations of recursive short-time signal analysis are evidently very rare and yet highly desirable, especially for real time processing.

In a sampled signal context a mathematical expression for the weighting or localizing process over a sliding time frame of a sampled signal at sample time n may be written as: $\bar{d}_k(m|n)=w_k(m)d_k(n-m)$ where d(n) is a sample taken at n, w(m) is the localizing and weighting function often referred to as a window and the k subscript allows for different windows. One particular feature estimation procedure is known as the short time Fourier Transform that is defined in a sampled signal context as:

$$F_k(n\mid\omega_k)=\sum_m e^{-jm\omega_k}w_k(m)d_k(n-m)\cdot$$

For $\omega_k=0$ this provides an average based estimation for all k and for $\omega_k\neq 0$ this provides a time-frequency estimate or frequency dependent energy or amplitude estimate at $\omega_k$.

As a generality the specific characteristics of $w_k(m)$ determine the relative accuracy of the feature estimates obtained,. upon for example execution of the above equation, and additionally determine the relative efficiency or computational burden incurred in the implementation of a recursive structure suitable for obtaining the above estimations. Various windows or $w_k(m)$ have been proposed and evaluated but all have suffered from either poor accuracy or undue computational burden thus severely limiting the utilization of recursive short time signal analysis to those circumstances where either accuracy was unimportant or substantial computational resources were available. Clearly a need exists for efficient and accurate signal analyzers using short-time signal analysis and methods of doing so.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

FIGS. 6.1, 6.2, 6.3, and 6.4 depict various preferred shapes of a localizing and weighting function suitable for use in the FIG. 4 signal analyzer.

DETAILED DESCRIPTION OF A PREFERRED EMBODIMENT

Figure 1:
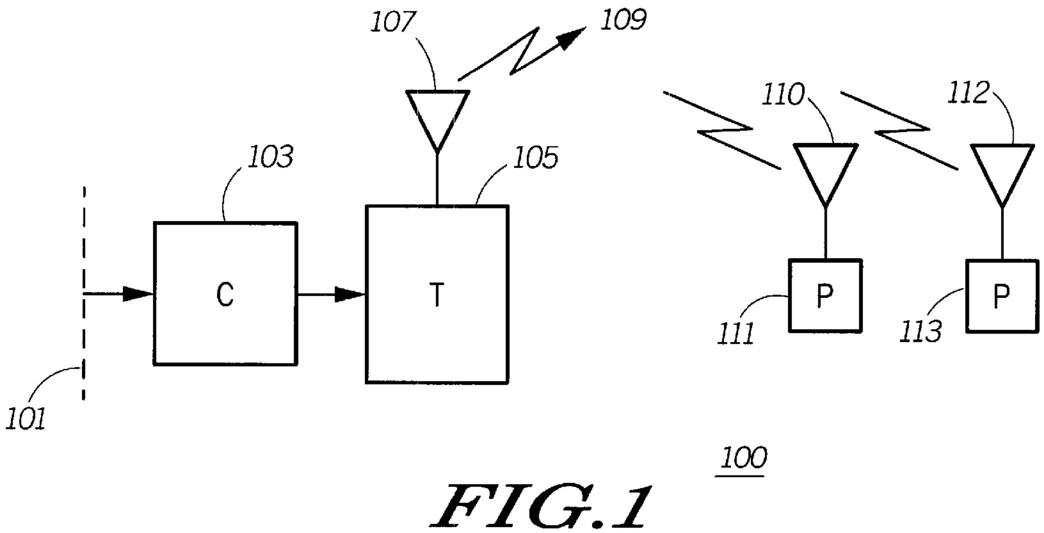
FIG. 1 is a block diagram of a wireless paging communications system suitable for employing an embodiment of the instant invention.

The instant invention deals with signal analyzers and methods thereof. Such analyzers and analogous methods may be advantageously employed, for example, in the demodulators or detectors found in wireless receivers used in wireless communications systems such as the wireless paging communications system (100) as generally depicted in FIG. 1.

As an overview various embodiments of a signal analyzer using short-time signal analysis to obtain a time variant feature from a signal are disclosed. The signal analyzer includes a signal sampler for providing a sequence of samples of the signal, and preferably including an input register for storing the sequence of samples of a portion of the signal, a multiplier for weighting in accordance with, alternatively, a half-sine, a cosine, a 2nd-order complex pole, or a 3rd-order complex pole function this sequence of samples to provide weighted samples of the signal, and a combiner for combining the weighted samples to provide a signal feature estimate for the signal or specifically the relevant or local portion.

The half-sine, cosine, 2nd-order complex pole, or 3rd-order complex pole function are, respectively and preferably defined as:

$$\left\{\begin{matrix} \frac{\sin([n+1]\pi/N)}{\sin\pi/N}, & n=0,1,\ldots N-2 \\ 0, & \text{otherwise} \end{matrix}\right\}$$

where the sequence of samples is N−1 samples;

$$\left\{\begin{matrix} \frac{\cos(\pi/N)-\cos[(2n+3)\pi/N]}{2[1-\cos 2\pi/N]\cos\pi/N}, & n=0,1,\ldots,N-3 \\ 0, & \text{otherwise} \end{matrix}\right\}$$

where the sequence of samples is N−2 samples;

$$\left\{\frac{\sin([n+1]\theta)}{\sin\theta}r^n, \quad n=0,1,2\ldots\right\},$$

$$\text{where } r \propto e^{\left(\frac{\theta \ln R_2}{\pi}\right)}, \text{ and } \theta \propto \frac{\tan^{-1}\left(\frac{-\pi}{\ln R_2}\right)}{lp+1};$$

$$\text{and } \left\{\frac{\left\{\cos\frac{\pi}{N}-\cos(2n+3)\pi/N\right\}r^n}{\cos\frac{\pi}{N}\left(2-2\cos 2\frac{\pi}{N}\right)}, \quad n=0,1,2,\ldots\right\},$$

$$\text{where } r \propto \exp\left(\frac{\ln R_3}{N}\right).$$

The signal feature estimates provided by the combiner may take many forms may be further combined into many others including averages, variances, nth order moments, etc. The instant disclosure details various particulars associated with signal feature estimates proportional to signal averages and frequency dependent energy estimates. In the case of the half-sine function the signal average and frequency dependent energy estimate at sample n are preferably and respectively provided in proportion to;

$$S_{avg}(n)=2\cos(\pi/N)S_{avg}(n-1)-S_{avg}(n-2)+d(n)+d(n-N),$$

where d(n) and d(n−N) are, respectively, a sample at n and n−N and $S_{avg}$(n−1) and $S_{avg}$(n−2) are, respectively, previous signal averages at sample n−1 and n−2; and $$F_d(n|\omega)=2e^{-j\omega}\cos(\pi/N)F_d(n-1|\omega)-e^{-j2\omega}F_d(n-2|\omega)+d(n)+e^{-jN\omega}d(n-N),$$

where d(n) and d(n−N) are, respectively, a sample at n and n−N and $F_d$(n−1|ω) and $F_d$(n−2|ω) are, respectively, frequency dependent energy estimates at sample n−1 and n−2.

In the case of the cosine function the signal average and frequency dependent energy estimate at sample n are preferably and respectively provided in proportion to;

$$S_{avg}(n)=(1+\cos 2\pi/N)[S_{avg}(n-1)-S_{avg}(n-2)]+S_{avg}(n-3)+d(n)-d(n-N)$$

where d(n) and d(n−N) are, respectively, a sample at n and n−N and $S_{avg}$(n−1), $S_{avg}$(n−2) and $S_{avg}$(n−3) are, respectively, previous signal averages at sample n−1, n−2, and n−3; and $$F_d(n|\omega)= e^{-j\omega}\left[1+2\cos 2\frac{\pi}{N}\right]F_d(n-1|\omega)-e^{-j2\omega}\left[1+2\cos 2\frac{\pi}{N}\right]F_d(n-2|\omega)+ e^{-j3\omega}F_d(n-3|\omega)+d(n)-e^{-jN\omega}d(n-N)$$

where d(n) and d(n−N) are, respectively, a sample at n and n−N and $F_d$(n−1|ω), $F_d$(n−2|ω), and $F_d$(n−3|ω) are, respectively, frequency dependent energy estimates at sample n−1, n−2, and n−3.

In the case of the 2nd order complex pole function the signal average and frequency dependent energy estimate at sample n are preferably and respectively provided in proportion to;

$$S_{avg}(n)=2r\cos\theta S_{avg}(n-1)-r^2S_{avg}(n-2)+d(n),$$

where d(n) is a sample at n and $S_{avg}$(n−1) and $S_{avg}$(n−2) are, respectively, previous signal averages at sample n−1 and n−2; and $$F_d(n|\omega)=2re^{-j\omega}\cos\theta F_d(n-1|\omega)-r^2e^{-j2\omega}F_d(n-2|\omega)+d(n),$$

where d(n) is a sample at n and $F_d$(n−1|ω) and $F_d$(n−2|ω) are, respectively, previous frequency dependent energy estimates at sample n−1 and n−2.

In the case of the 3rd order complex pole function the signal average and frequency dependent energy estimate at sample n are preferably and respectively provided in proportion to;

$$S_{avg}(n)=r(1+2\cos\theta)S_{avg}(n-1)-r^2(1+2\cos\theta)S_{avg}(n-2)+r^3S_{avg}(n-3)+d(n),$$

where d(n) is a sample of the signal at n, $S_{avg}$(n−1), $S_{avg}$(n−2), and $S_{avg}$(n−2) are, respectively, previous signal averages at sample n−1, n−2, and n−3; θ=2π/N, N being an integer and $$F_d(n|\omega)=r(1+2\cos\theta)e^{-j\omega}F_d(n-1|\omega)-r^2(1+2\cos\theta)e^{-j2\omega}F_d(n-2|\omega)+r^3e^{-j3\omega}F_d(n-3|\omega)+d(n)$$

where d(n) is a sample at n and $F_d$(n−1|ω), $F_d$(n−2|ω), and $F_d$(n−3|ω) are, respectively, frequency dependent energy estimates at sample n−1, n−2, and n−3.

The instant disclosure further shows a signal analyzer suitable for using recursive short time signal analysis to obtain a time varying feature from a signal. This analyzer, preferably includes a signal sampler for sampling the signal to provide a sequence of samples of the signal, and a combiner for combining a first signal, a second signal, a first previous estimate of the time varying feature, and a second previous estimate of the time varying feature to provide a signal feature estimate or current feature estimate. The first signal and the second signal, respectively, correspond to a first sample and a second sample from the sequence of samples of the signal, where the second sample is spaced by at least one sample from the first sample. The first previous estimate of the time varying feature is weighted by a cosine function having an argument inversely proportional to a number of samples equal to a sum of the at least one sample plus two or specifically the first sample and the second sample.

This recursive version of a signal analyzer provides feature estimates including such estimates proportional to a signal average and a frequency dependent energy estimate. Preferably the signal average and frequency dependent energy estimate is given by;

$$S_{avg}(n)=2\cos(\pi/N)S_{avg}(n-1)-S_{avg}(n-2)+d(n)+d(n-N),$$

where d(n) and d(n−N) are, respectively, said first sample taken at n and said second sample taken at n−N and $S_{avg}$(n−1) and $S_{avg}$(n−2) are, respectively, said first previous estimate at sample n−1 and said second previous estimate at sample n−2; and $$F_d(n|\omega)=2e^{-j\omega}\cos(\pi/N)F_d(n-1|\omega)-e^{-j2\omega}F_d(n-2|\omega)+d(n)+e^{-jN\omega}d(n-N),$$

where d(n) and d(n−N) are, respectively, a sample at n and n−N and $F_d$(n−1|ω) and $F_d$(n−2|ω) are, respectively, frequency dependent energy estimates at sample n−1 and n−2.

In a further preferred embodiment the combiner additionally combines a third previous estimate as well as the second previous estimate weighted by the cosine function. The signal average and frequency dependent energy estimate is now preferably given by;

$$S_{avg}(n)=(1+2\cos 2\pi/N)(S_{avg}(n-1)-S_{avg}(n-2))+S_{avg}(n-3)+d(n)-d(n-N),$$

where d(n) and d(n−N) are, respectively, said first sample taken at n and said second sample taken at n−N and $S_{avg}$(n−1), $S_{avg}$(n−2), and $S_{avg}$(n−3) are, respectively, said first previous estimate at sample n−1, said second previous estimate at sample n−2, and said third previous estimate at sample n−3; and $$F_d(n|\omega)=e^{-j\omega}(1+2\cos(2\pi/N))F_d(n-1|\omega)-e^{-j2\omega}(1+2\cos(2\pi/N))F_d(n-2|\omega)+e^{-j3\omega}F_d(n-3|\omega)+d(n)-e^{-jN\omega}d(n-N),$$

where d(n) and d(n−N) are, respectively, a sample at n and n−N and $F_d$(n−1|ω), $F_d$(n−2|ω) and $F_d$(n−3|ω) are, respectively, frequency dependent energy estimates at sample n−1, n−2, and n−3.

An alternative preferred embodiment of a signal analyzer suitable for using recursive short time signal analysis to obtain a time varying feature from a signal includes a signal sampler for sampling the signal to provide a sequence of samples of the signal, and a combiner for combining a first signal corresponding to a first sample, a first previous estimate of the time varying feature weighted by a cosine function having an argument inversely proportional to a number of said sequence of samples, and a second previous estimate of the time varying feature exponentially weighted in proportion to said argument to provide a signal feature estimate or current feature estimate. Similar to the above embodiments this analyzer and a further alternative preferred embodiment may provide the signal feature estimate proportional to a signal average or a frequency dependent energy estimate.

This signal analyzer provides the signal average and frequency dependent energy estimate at sample n, preferably and respectively in accordance with;

$$S_{avg}(n)=2r\cos\theta(S_{avg}(n-1))-r^2S_{avg}(n-2)+d(n),$$

where d(n) is said first sample taken at n, $S_{avg}$(n−1) and $S_{avg}$(n−2) are, respectively, said first previous estimate at sample n−1 and said second previous estimate at sample n−2, $$r \propto e^{\left(\frac{\theta \ln R_2}{\pi}\right)}, \text{ and } \theta \propto \frac{\tan^{-1}\left(\frac{-\pi}{\ln R_2}\right)}{lp+1};$$

and $$F_d(n|\omega)=2re^{-j\omega}\cos(\theta)F_d(n-1|\omega)-r^2e^{-j2\omega}F_d(n-2|\omega))+d(n),$$

where d(n) is said first sample taken at n, $F_d$(n−1|ω) and $F_d$(n−2|ω) are, respectively, frequency dependent energy estimates at sample n−1 and n−2, $$r \propto e^{\left(\frac{\theta \ln R_2}{\pi}\right)}, \text{ and } \theta \propto \frac{\tan^{-1}\left(\frac{-\pi}{\ln R_2}\right)}{lp+1}.$$

In the further alternative preferred embodiment of this signal analyzer the combiner additionally combines a third previous estimate exponentially weighted as well as the second previous estimate weighted by the cosine function. This embodiment provides the signal average and frequency dependent energy estimate at sample n, preferably and respectively in accordance with;

$$S_{avg}(n)-(1+2\cos\theta)(rS_{avg}(n-1)-r^2S_{avg}(n-2))+r^3S_{avg}(n-3)+d(n),$$

where d(n) is said first sample taken at n, $S_{avg}$(n−1), $S_{avg}$(n−2), and $S_{avg}$(n−3) are, respectively, said first previous estimate at sample n−1, said second previous estimate at sample n−2, and said third previous estimate at sample n−3, $$r \propto e^{\left(\frac{\theta \ln R_3}{2\pi}\right)}, \text{ and } \theta \propto 2\pi/N;$$

and $$F_d(n|\omega)=re^{-j\omega}(1+2\cos(\theta))F_d(n-1|\omega)-r^2e^{-j2\omega}(1+2\cos(\theta))F_d(n-2|\omega)+r^3e^{-j3\omega}F_d(n-3|\omega)+d(n),$$

where d(n) is said first sample taken at n, $F_d$(n−1|ω), $F_d$(n−2|ω), and $F_d$(n−3|ω) are, respectively, frequency dependent energy estimates at sample n−1, n−2, and n−3, $$r \propto e^{\left(\frac{\theta \ln R_3}{2\pi}\right)}, \text{ and } \theta \propto 2\pi/N.$$

Referring to the Figures a more detailed explanation of the instant disclosure will be provided. FIG. 1 depicts a paging system (100) in overview block diagram format. The paging system includes a controller (103) coupled to a message source (101), such as the Public Switched Telephone Network. The controller (103) is coupled to a base transmitter (105) and provides paging messages and control information to this transmitter. The base transmitter uses the paging messages to modulate a radio frequency carrier in accordance with the chosen modulation technique, such as preferably frequency shift keying (FSK) and transmits the messages, as modulated radio frequency carrier over antenna (107) and the wireless channel (109) to the paging message units (PMU) (111, 113) via their respective antennas (110, 112). It is noted that the one way paging system (100) is merely an exemplary setting for the instant disclosure and serves only to facilitate disclosure and in no way is intended to limit the true spirit and scope of the present invention.

Figure 2:
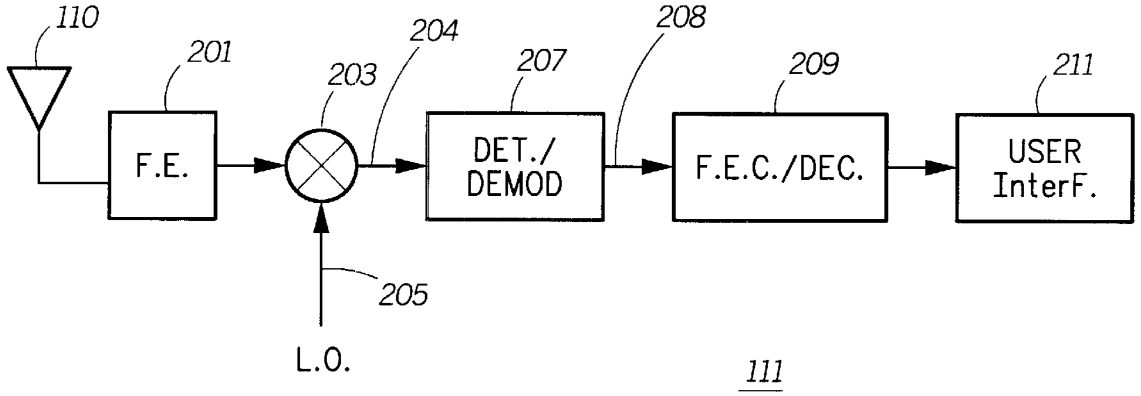
FIG. 2 is a more detailed block diagram of a paging messaging unit (PMU) as shown in the FIG. 1 system and suitable for employing an embodiment of the instant invention.

Referring to the block diagram of FIG. 2 the basic functional blocks of the PMU (111) are depicted. Antenna (110) couples the radio signal from the wireless channel (109) to a receiver front end (201) where it is, preferably, amplified and filtered as well known and then applied to a mixer (203). Mixer (203) multiplies the radio signal from the front end by a local oscillator (205) to translate the modulated radio frequency carrier to a baseband signal, a near zero frequency carrier with the FSK modulation imposed thereon at input (204). The baseband signal, preferably an in phase and quadrature signal (I and Q), is coupled to the detector/demodulator (demodulator) (207) where it is converted to a symbol pattern at output (208).

The symbol pattern at (208) is coupled to the forward error correction (FEC)/decoder unit (209) where errors are corrected and the symbols are decoded to provide a message that is coupled to the user interface block (211) all as well known in the art. The user interface block is any suitable indicator or collection thereof that alerts a user that a message has been received and what the contents of that message may be. Such indicators include audible, visual, or physical motion alerting devices and various numeric or alpha numeric displays for showing the message contents.

Figure 3:
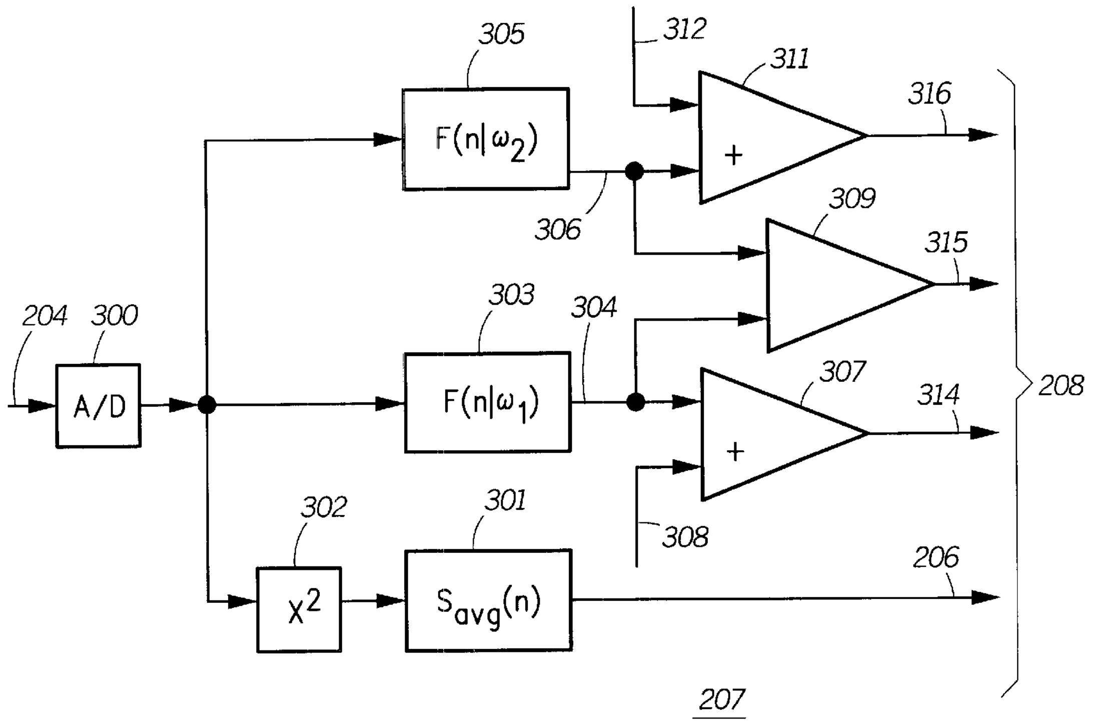
FIG. 3 is a more detailed block diagram of a portion of the FIG. 2 PMU depicting a demodulator in accordance with a preferred embodiment of the instant invention.

FIG. 3 depicts the demodulator (207) in further detail. The baseband signal at input (204) is coupled to an A/D converter (300) with an output coupled to a first signal analyzer (301) through a signal squaring unit (302). The output of the A/D converter (300) is also coupled to a second and a third signal analyzer (303, 305). For simplicity, the discussion here focuses on a demodulator suitable for operating in a two level FSK system. The demodulator may be readily extended to four or more level modulation by adding additional signal analyzers such as (303, 305) as will be apparent to those skilled in the art. These signal analyzers are implemented preferably in a digital signal processor (DSP), such as a Motorola 56000 series DSP, and operate in a sampled or discrete signal mode on the samples provided by A/D converter (300).

Signal analyzer (301) provides an output at (206) that is proportional to the average value of the signal provided from the squaring unit (302). This average value is a signal feature estimate or feature estimate that is proportional to a signal average, specifically signal power, of the baseband or discrete baseband signal and is often referred to as a received signal strength indication (RSSI). The RSSI at output (206) is part of the output (208) used as the input to the FEC/Decoder (209). This Decoder (209) uses the RSSI as a relative confidence indicator for the symbol pattern as is known in the art.

Signal analyzers (303, 305) operate to provide a first and a second frequency dependent energy estimate at, respectively, frequency 1, preferably, +800 Hz on output (304) and frequency 2, preferably −800 Hz on output (305). The estimate at output (304) and the estimate at output (306) are compared, respectively, to a first and second reference (308, 312) by comparators (307, 311). When the frequency dependent energy estimates at, respectively, outputs (304, 306) satisfy, preferably exceed, the respective references (308, 312) outputs (314, 316), each part of output (208), of comparators (307, 311), respectively, indicate a first symbol or second symbol. In addition outputs (304, 306) are coupled to and compared by a comparator (309) with an output (315), again a part of output (208). When the relative magnitude of the first and second frequency dependent energy estimate changes the output (315) will change states, designating the end of one symbol time period and the beginning of another. Collectively the symbol indications at outputs (314, 316), the timing indication at output (315), and the RSSI at output (206) is used by the error correction and decoder unit (209) as is well known.

Figure 4:
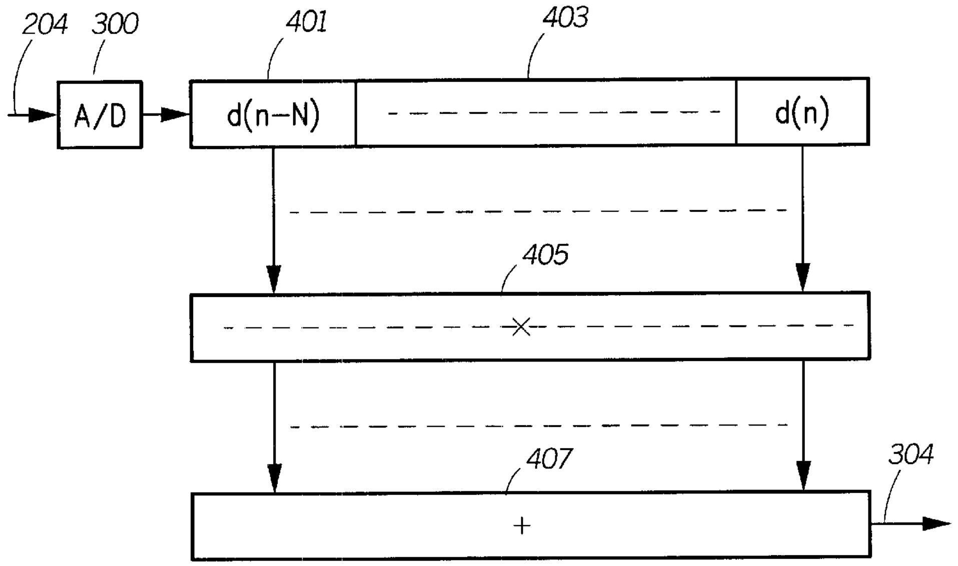
FIG. 4 is a block diagram of a signal analyzer in accordance with a preferred embodiment of the instant invention and suitable for use in the FIG. 3 demodulator.

Referring now to FIG. 4, a detailed explanation of the signal analyzers (303) will be undertaken. FIG. 4 is a block diagram of a signal analyzer in accordance with a preferred embodiment of the instant invention and is suitable for use in the FIG. 3 demodulator. The FIG. 4 structure, excluding previously mentioned elements with like reference numerals, is suitable for implementing either signal analyzer (303), (305), or analogously (301). The FIG. 4 signal analyzer uses short-time signal analysis to obtain a time variant feature, such as a signal average or frequency dependent energy estimate, etc., from a signal. As noted above the baseband signal at input (204) is coupled to the A/D converter (300). A/D converter (300) is coupled to an input register (403) and together they form a signal sampler (401). The signal sampler (401) is for sampling the signal at the output of A/D converter (300) to provide a sequence of samples, d(n) . . . d(n−N), of the signal and preferably includes the input register (403) for storing the sequence of samples of a portion of the signal.

This sequence of samples is then coupled to a multiplier (405) and the multiplier is for weighting in accordance with, alternatively, a half-sine, a cosine, a 2nd order complex pole, or a 3rd order complex pole function, the sequence of samples to provide weighted samples, preferably, of the portion of the signal. The weighted samples are then coupled to a combiner (407) where they are combined to provide a signal feature estimate or feature estimate, such as found at outputs (206, 304, or 306), specifically and respectively a feature estimate proportional to a signal average or RSSI, or a frequency dependent on frequency 1 (+800 Hz), or on frequency 2 (−800 Hz), energy estimate.

Figure 5:
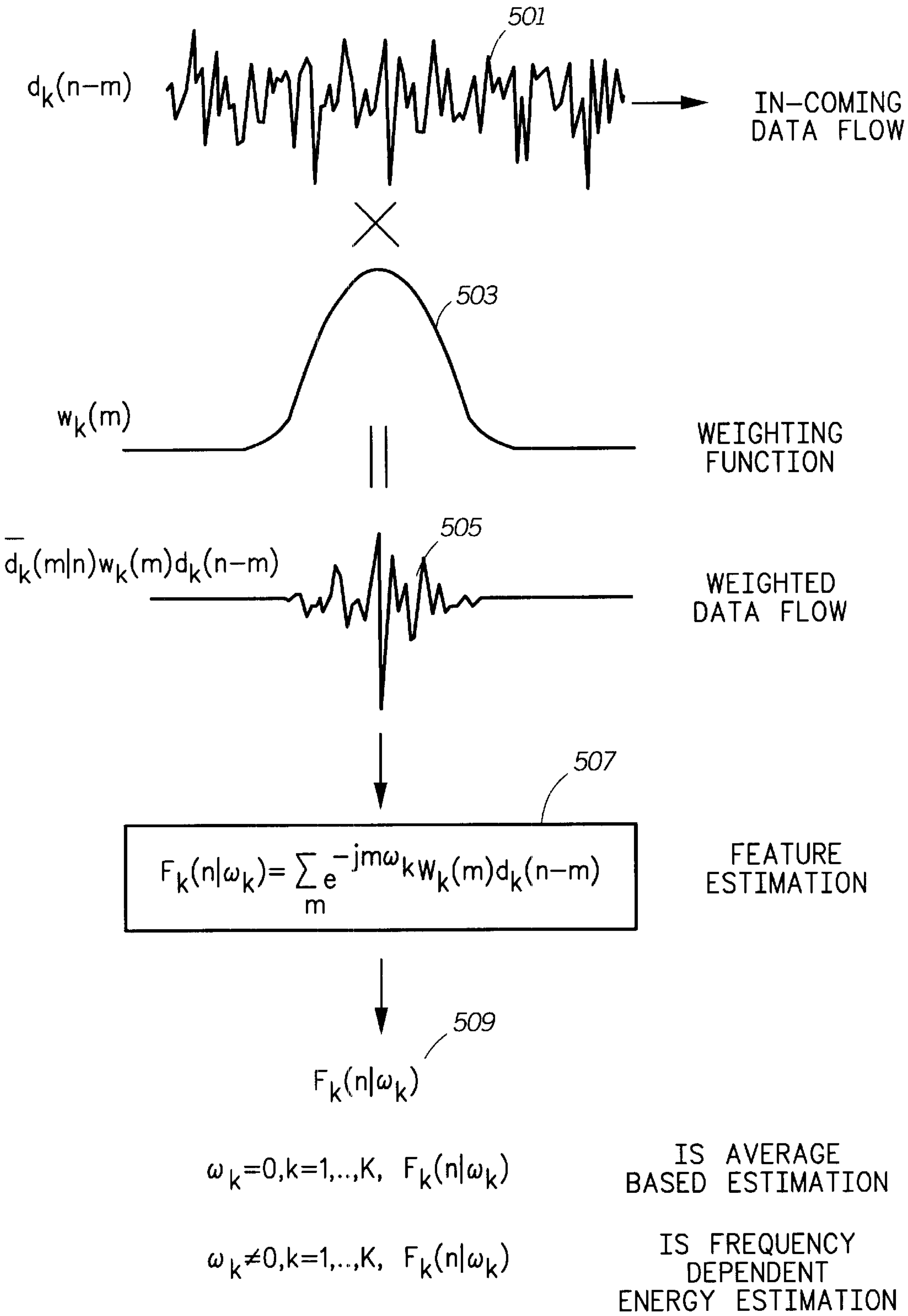
FIG. 5 is a conceptual diagram of the operation of the FIG. 4 signal analyzer.

To further enhance appreciation of the instant invention the reader is referred to the FIG. 5 conceptual diagram pictorially showing the operation of the FIG. 4 signal analyzer. FIG. 5 depicts a signal that may be viewed as an incoming data flow (501) including a plethora or sequence of samples, $d_k(n-m)$ of a portion of the signal. This sequence of samples is multiplied or weighted by the weighting function, $w_k(m)$ (503), where $w_k(m)$ may take any number of shapes or forms, denoted by the k suffix, to provide a weighted signal flow (505) or sequence of weighted samples or a weighted signal expressed algebraically as: $\bar{d}_k(m|n)=w_k(m)d_k(n-m)$.

These weighted samples are then combined (507) to provide a feature estimate (509) for the weighted samples or the portion of the signal. While various combinations may be used, the discrete Short-Time Fourier Transform (STFT) defined as:

$$F_k(n \mid \omega_k) = \sum_m e^{-jm\omega_k} w_k(m) d_k(n-m)$$

may be particularly useful. This expression reduces to the average of the weighted samples or a feature estimate proportional to a signal average when $\omega_k=0$ and provides a frequency dependent energy estimate, $F_k(n|\omega_k)$ for all other $\omega_k$. Thus for $\omega_k=0$ the structure of FIG. 4 will serve as the signal analyzer (301) and yield an output proportional to the RSSI of the signal of the squaring unit (301). For $\omega_k=\omega_1$ the structure of FIG. 4 will provide the function of signal analyzer (303) and so forth.

FIGS. 6.1, 6.2, 6.3, and 6.4 depict various preferred and normalized shapes for the localizing and weighting function $w_k(m)$ suitable for use in the FIG. 4 signal analyzer. Generally a desirable function is relatively symmetric, single peaked, non-negative, and smoothly tapered at the edges. FIG. 6.1 depicts a half-sine window or weighting function (601) defined by the equation (603) for sample n=0, 1, . . . , N−2 (605). FIG. 6.2 depicts a half-cosine window or weighting function (607) defined by the equation (609) for sample n=0, 1, . . . , N−3 (611).

The parameter N controls the number of samples that will be included or play a role in the feature estimate or for a given sampling rate the temporal width or duration of the sequence of samples. This parameter is selected depending on various design tradeoffs but must be sufficient to satisfy various practical considerations. That is you will need at least 2 and preferably 3 or so samples of the highest frequency you expect to resolve. Practical sampling rates and tolerance for signal analyzer latency traded with accuracy will limit an upper boundary on N. In one embodiment of the PMU of FIG. 2 where + and −800 Hz needed to be resolved within a time period of 0.2 milliseconds at a sampling rate of 20,000 samples per second it was experimentally determined that an N of 16 was satisfactory.

FIG. 6.3 depicts a 2nd order complex pole window or weighting function (613) defined by the equation (615) with θ and r being defined in terms of $l_p$ (614), the number of samples from n=0 to the maximum normalized value of 1, here n=5, for the weighting function and $R_2$ (616), the amplitude of the first negative peak value for the weighting function. Although determining with precision the number of samples that will impact a given feature estimate is somewhat problematic using the 2nd order complex pole function for practical situations where $R_2$ will be minimized and the relative symmetry of the function will be maximized in order to be, as above indicated, consistent with desirable weighting functions or windows $l_p$ (614) for all practical purposes determines the number of samples that will have a substantial or significant effect on a feature estimate.

FIG. 6.4 depicts a 3rd order complex pole window or weighting function (619) defined by the equation (621) with r being defined in terms of $R_3$ (617), the amplitude of the second normalized maximum value of the weighting function, and N, the number of samples in a period of the function or window. Again for practical circumstances with desirable windows or functions chosen the value of $R_3$ (617) will be minimized and N will determine the number of samples that will have a significant effect on a feature estimate.

Figure 7:
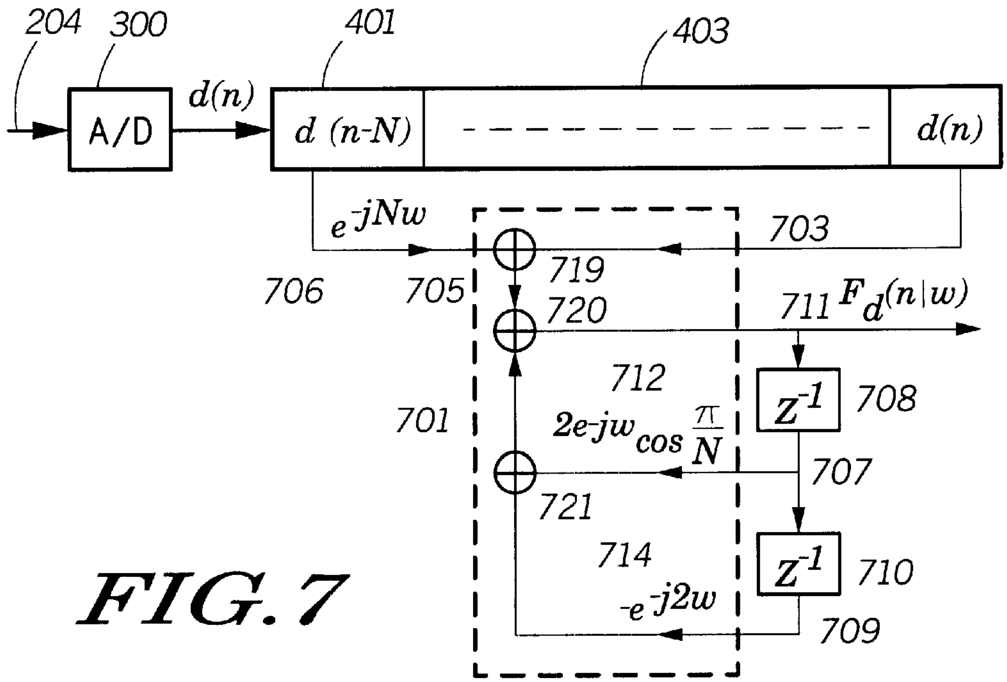
FIG. 7 is a block diagram of a signal analyzer using recursive analysis in accordance with a preferred embodiment of the instant invention.

FIG. 7 is a block diagram of a signal analyzer using recursive, preferably short time, signal analysis to obtain a time varying feature from or for a signal. This signal analyzer includes a signal sampler, such as the signal sampler (401), for sampling the signal to provide a sequence of samples of the signal and a combiner (701) for combining a first signal (703), a second signal (705), a first previous estimate of the time varying feature (707), and a second previous estimate (709) of the time varying feature to provide a current feature estimate (711). The first signal and the second signal, respectively, correspond to a first sample, here d(n), and a second sample, here d(n−N) from the sequence of samples of the signal. The second sample is spaced by at least one sample, here N−2 samples, from the first sample and weighted or multiplied by the complex function $e^{-jN\omega}$ (706).

The first previous estimate, designated as $F_d(n-1|\omega)$ (707) of the time varying feature is provided by a one time period delay stage (708) and is weighted by an expression given by $e^{-j\omega}(2\cos\pi/N)$ (712) that includes a cosine function having an argument inversely proportional to a number of samples equal to a sum of the at least one sample, the first sample and the second sample or here N samples. The second previous estimate, designated as $F_d(n-2|\omega)$ (709) of the time varying feature is provided by another one time period delay stage (710) and is weighted by the complex function $-e^{-j2\omega}$ (714).

Given the above signals, previous estimates etc., as weighted, the combiner performs an algebraic summation using adders (719, 720, 721) to provide a current feature estimate or feature estimate or signal feature estimate designated $F_d(n|\omega)$ (711). $F_d(n|\omega)$ is a frequency dependent energy estimate and may be algebraically defined as:

$$F_d(n|\omega))=2e^{-j\omega}\cos(\pi/N)F_d(n-1|\omega)-e^{-j2\omega}F_d(n-2|\omega)+d(n)+e^{-jN\omega}d(n-N),$$

for ω≠0 and for ω=0 reduces to:

$S_{avg}(n)=2\cos(\pi/N)S_{avg}(n-1)-S_{avg}(n-2)+d(n)+d(n-N)$, with $F_d(n|0)$ is defined as $S_{avg}(n)$, etc., or simply a signal average for d(n). In summary it has been discovered and can be shown that the structure of FIG. 7 provides, at sample n, a feature estimate for a signal d(n) that is equivalent to the feature estimate provided by the structure of FIG. 4 when the weighting function or window is the half sine function of FIG. 6.1.

Figure 8:
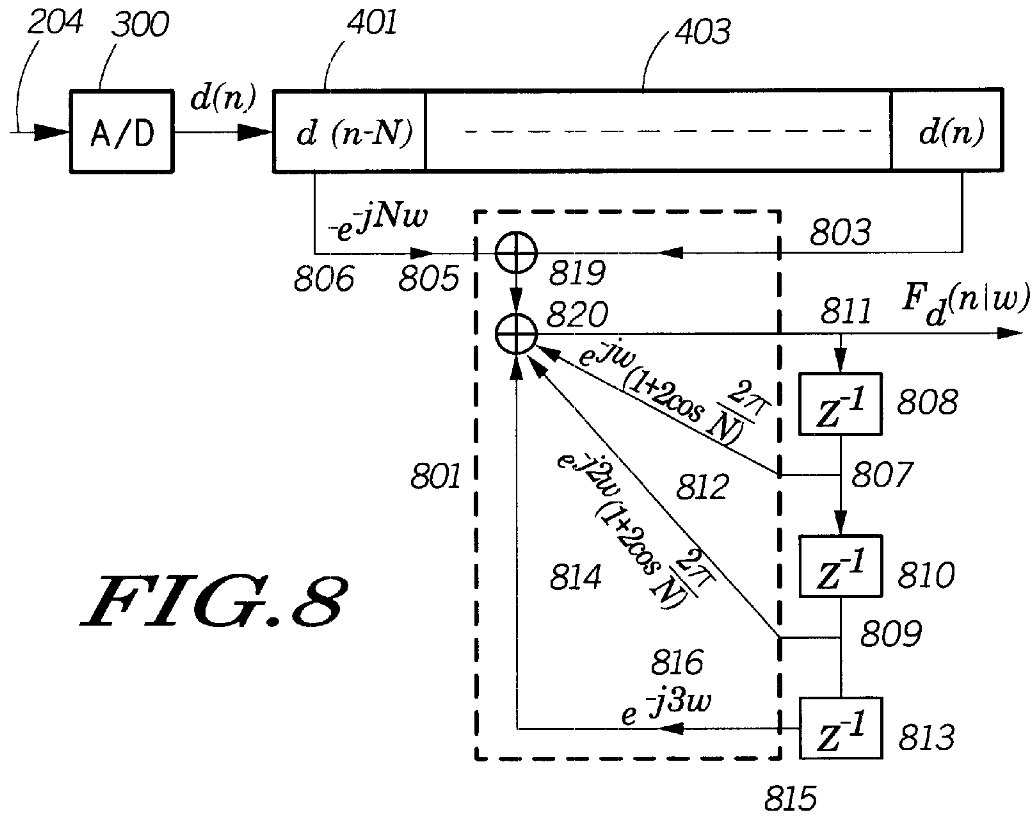
FIG. 8 is a block diagram of a signal analyzer using recursive analysis in accordance with an alternative embodiment of the instant invention.

FIG. 8 is a block diagram of a signal analyzer using recursive analysis in accordance with an alternative embodiment of the instant invention. The FIG. 8 signal analyzer is analogous to the FIG. 7 analyzer in numerous ways including the signal sampler (401) and the combiner (701), however the combiner (801) additionally combines a third previous estimate, designated as $F_d(n-3|\omega)$ (815) provided by a further delay stage (813) as well as the second previous estimate weighted by the cosine function.

More specifically the combiner (801) combines a first signal (803), a second signal (805), a first previous estimate of the time varying feature (807), a second previous estimate (809) of the time varying feature, and the third previous estimate (815) to provide a current feature estimate (811). The first signal and the second signal, respectively, correspond to a first sample, here d(n), and a second sample, here d(n−N) from the sequence of samples of the signal. The second sample is spaced by at least one sample, here N−2 samples, from the first sample and weighted or multiplied by the complex function $-e^{-jN\omega}$ (806).

The first previous estimate, designated as $F_d(n-1|\omega)$ (807) of the time varying feature is provided by a one time period delay stage (808) and is weighted by an expression given by $e^{-j\omega}(1+2\cos(2\pi/N))$ (812) that includes a cosine function having an argument inversely proportional to a number of samples equal to a sum of the at least one sample, the first sample and the second sample or here N samples. The second previous estimate, designated as $F_d(n-2|\omega)$ (809) of the time varying feature is provided by another one time period delay stage (810) and is weighted by the complex function $-e^{-j2\omega}(1+2\cos(2\pi/N))$ (814). The third previous estimate, designated as $F_d(n-3|\omega)$ (815) of the time varying feature is provided by the delay stage (813) and is weighted by the complex function $-e^{-j3\omega}$ (816).

Given the above signals, previous estimates etc., as weighted, the combiner performs an algebraic summation using adders (819, 820) to provide a current feature estimate or feature estimate or signal feature estimate designated $F_d(n|\omega))$ (811). $F_d(n|\omega)$ is a frequency dependent energy estimate and may be algebraically defined as:

$$F_d(n|\omega)=e^{-j\omega}(1+2\cos(2\pi/N))F_d(n-1|\omega)-e^{-j2\omega}(1+2\cos(2\pi/N))F_d(n-2|\omega)+e^{-j3\omega}F_d(n-3|\omega)+d(n)-e^{-jN\omega}d(n-N),$$

for ω≠0 and for ω=0 reduces to:

$S_{avg}(n)=(1+2\cos 2\pi/N)(S_{avg}(n-1)-S_{avg}(n-2))+S_{avg}(n-3)+d(n)-d(n-N)$, where $F_d(n|\omega=0)$ is defined as $S_{avg}(n)$, etc., or simply a signal average for d(n). In summary it has been discovered and can be shown that the structure of FIG. 8 provides, at sample n, a feature estimate for a signal d(n) that is equivalent to the feature estimate provided by the structure of FIG. 4 when the weighting function or window is the cosine function of FIG. 6.2.

Figure 9:
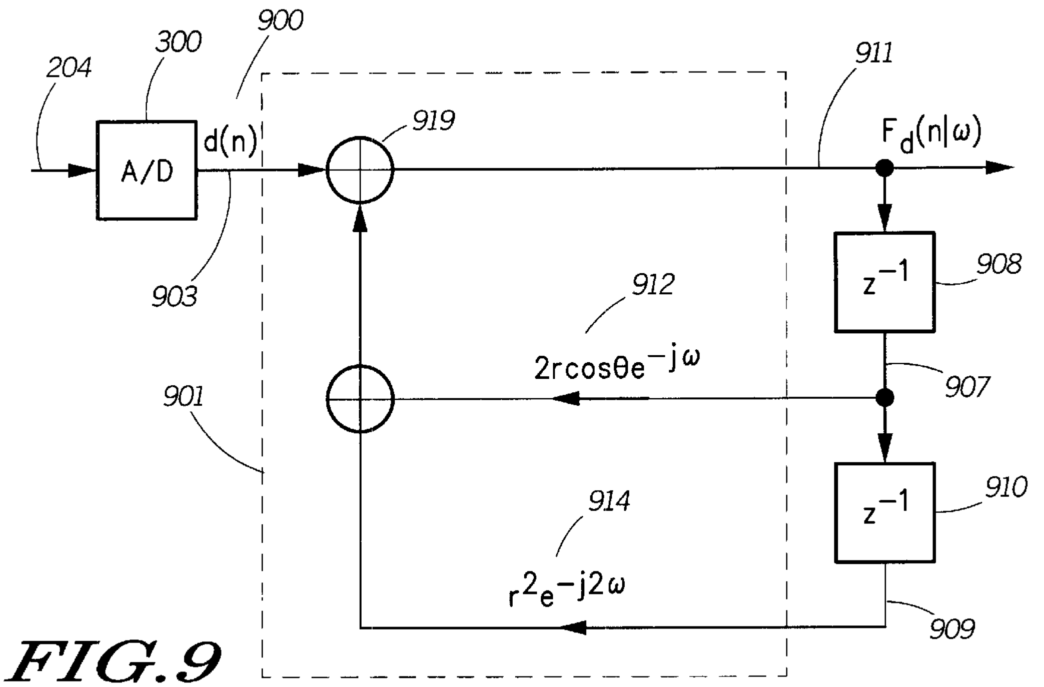
FIG. 9 is a block diagram of a signal analyzer using recursive analysis in accordance with a further embodiment of the instant invention.

FIG. 9 is a block diagram of a signal analyzer using recursive analysis in accordance with a further embodiment of the instant invention. This signal analyzer uses recursive short time signal analysis to obtain a time varying feature from a signal and includes a signal sampler (900) for sampling the signal to provide a sequence of samples of the signal and a combiner (901) for providing a current feature estimate or signal feature estimate by combining a first signal (903) corresponding to a first sample d(n), a first previous estimate, designated $F_d(n-1|\omega)$ (907) provided by a delay stage (908), of the time varying feature weighted by a function defined as 2r cos $\theta e^{-j\omega}$ that includes a cosine function having an argument θ that is inversely proportional to a number of the sequence of samples, and a second previous estimate, designated $F_d(n-2|\omega)$ (909) provided by a delay stage (910), of the time varying feature weighted by a function defined as $-r^2e^{-j2\omega}$ where $$r \propto e^{\left(\frac{\theta \ln R_2}{\pi}\right)}, \quad \text{and} \quad \theta \propto \frac{\tan^{-1}\left(\frac{-\pi}{\ln R_2}\right)}{lp+1}$$

thus r is exponentially weighted in proportion to the argument θ.

Given the above signals, previous estimates etc., as weighted, the combiner performs an algebraic summation using adders (919, 920) to provide a current feature estimate or feature estimate or signal feature estimate designated. $F_d(n|\omega)$ (911). $F_d(n|\omega)$ is a frequency dependent energy estimate and may be algebraically defined as:

$$F_d(n|\omega)=2re^{-j\omega}\cos(\theta)F_d(n-1|\omega)-r^2e^{-j2\omega}F_d(n-2|\omega)+d(n),$$

for ω≠0 and for ω=0 reduces to:

$S_{avg}(n)=2r\cos\theta(S_{avg}(n-1))-r^2S_{avg}(n-2)+d(n)$, with $F_d(n|0)$ defined as $S_{avg}(n)$, etc., or simply a signal average for d(n). In summary it has been discovered and can be shown that the structure of FIG. 9 provides, at sample n, a feature estimate for a signal d(n) that is equivalent to the feature estimate provided by the structure of FIG. 4 when the weighting function or window is the 2nd order complex pole function of FIG. 6.3.

Figure 10:
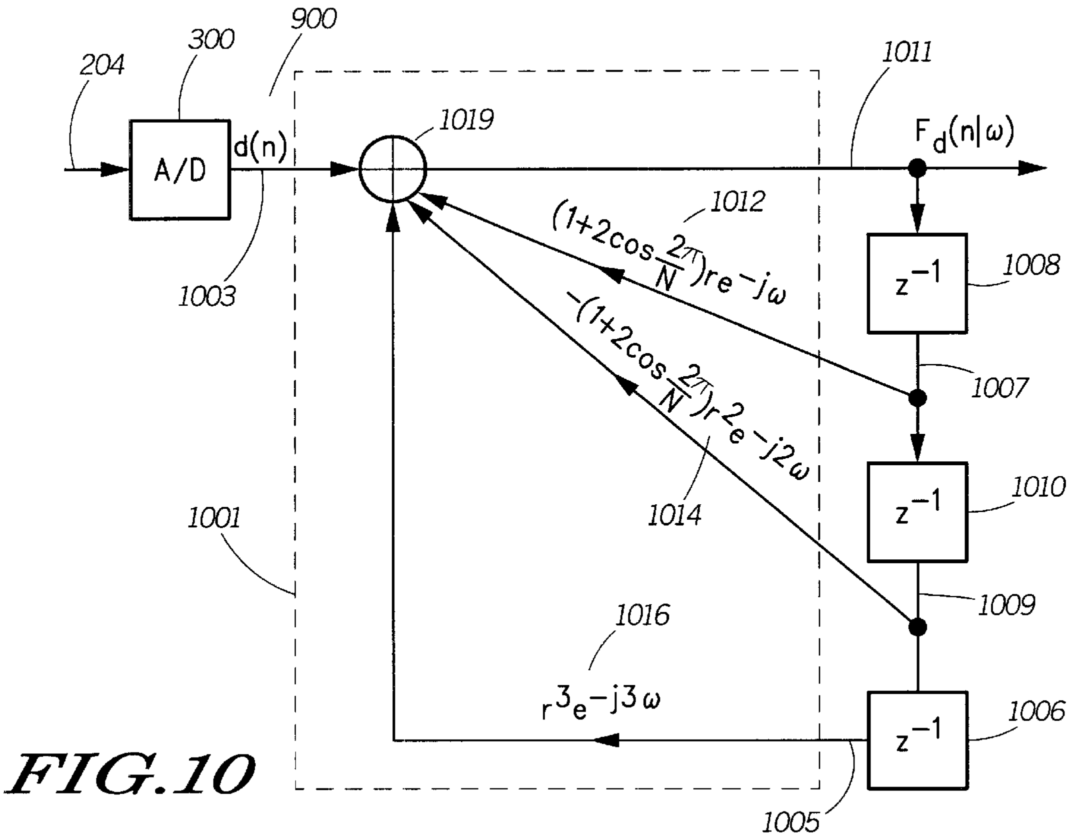
FIG. 10 is a block diagram of a signal analyzer using recursive analysis in accordance with yet another embodiment of the instant invention.

FIG. 10 is a block diagram of a signal analyzer using recursive analysis in accordance with yet another embodiment of the instant invention. The FIG. 10 signal analyzer is analogous to the FIG. 9 analyzer in numerous ways including the signal sampler (900) and the combiner (901), however the combiner (1001) additionally combines a third previous estimate, designated as $F_d(n-3|\omega)$ (1005) provided by a further delay stage (1006), exponentially weighted as well as the second previous estimate weighted by a cosine function.

More specifically the combiner (1001) combines a first signal (1003), a first previous estimate of the time varying feature (1007), a second previous estimate (1009) of the time varying feature, and the third previous estimate (1005) to provide a current feature estimate (1011). The first signal corresponds to a first sample, here d(n) from the sequence of samples of the signal.

The first previous estimate, designated as $F_d(n-1|\omega)$ (1007) of the time varying feature is provided by a one time period delay stage (1008) and is weighted by an expression given by $re^{-j\omega}(1+2\cos(2\pi/N))$ (1012) where $$r \propto e^{\left(\frac{\theta \ln R_3}{2\pi}\right)}, \quad \text{and} \quad \theta = 2\pi/N$$

that includes a cosine function having an argument inversely proportional to a number of the sequence of samples or here N samples. The second previous estimate, designated as $F_d(n-2|\omega)$ (1009) of the time varying feature is provided by another one time period delay stage (1010) and is weighted by the complex function $-r^2e^{-j2\omega}(1+2\cos(2\pi/N))$ (1014). The third previous estimate, designated as $F_d(n-3|\omega)$ (1005) of the time varying feature is provided by the delay stage (1006) and is weighted by the complex function $r^3e^{-j3\omega}$ (1016).

Given the above signals, previous estimates etc., as weighted, the combiner performs an algebraic summation using adder (1019) to provide a current feature estimate or feature estimate or signal feature estimate designated $F_d(n|\omega)$ (1011). $F_d(n|\omega)$ is a frequency dependent energy estimate and may be algebraically defined as:

$$F_d(n|\omega)=re^{-j\omega}(1+2\cos(\theta))F_d(n-1|\omega)-r^2e^{-j2\omega}(1+2\cos(\theta))F_d(n-2|\omega)+r^3e^{-j3\omega}F_d(n-3|\omega)+d(n),$$

with θ=2π/N for ω≠0 and for ω=0 reduces to:

$S_{avg}(n)=(1+2\cos\theta)(rS_{avg}(n-1)-r^2S_{avg}(n-2))+r^3S_{avg}(n-3)+d(n)$, where $F_d(n|\omega=0)$ is defined as $S_{avg}(n)$, etc., or simply a signal average for d(n). In summary it has been discovered and can be shown that the structure of FIG. 10 provides, at sample n, a feature estimate for a signal d(n) that is equivalent to the feature estimate provided by the structure of FIG. 4 when the weighting function or window is the 3rd order complex pole function of FIG. 6.4.

The signal analyzers depicted in FIGS. 7–10 are each suitable for implementation as software programs operating in a DSP environment such as a Motorola 56000 series DSP. These analyzers each provide various advantages over here to fore known signal analyzers using recursive short-time signal analysis. For example the signal analyzer of FIG. 7 has been shown to be either as accurate and significantly more computationally efficient or significantly more accurate at similar levels of computational burden to here to fore known recursive analyzers. The signal analyzers of FIGS. 9 and 10 are especially advantageous for real time signal analysis as the memory requirements represented by the input register (403) are not present.

Figure 11:
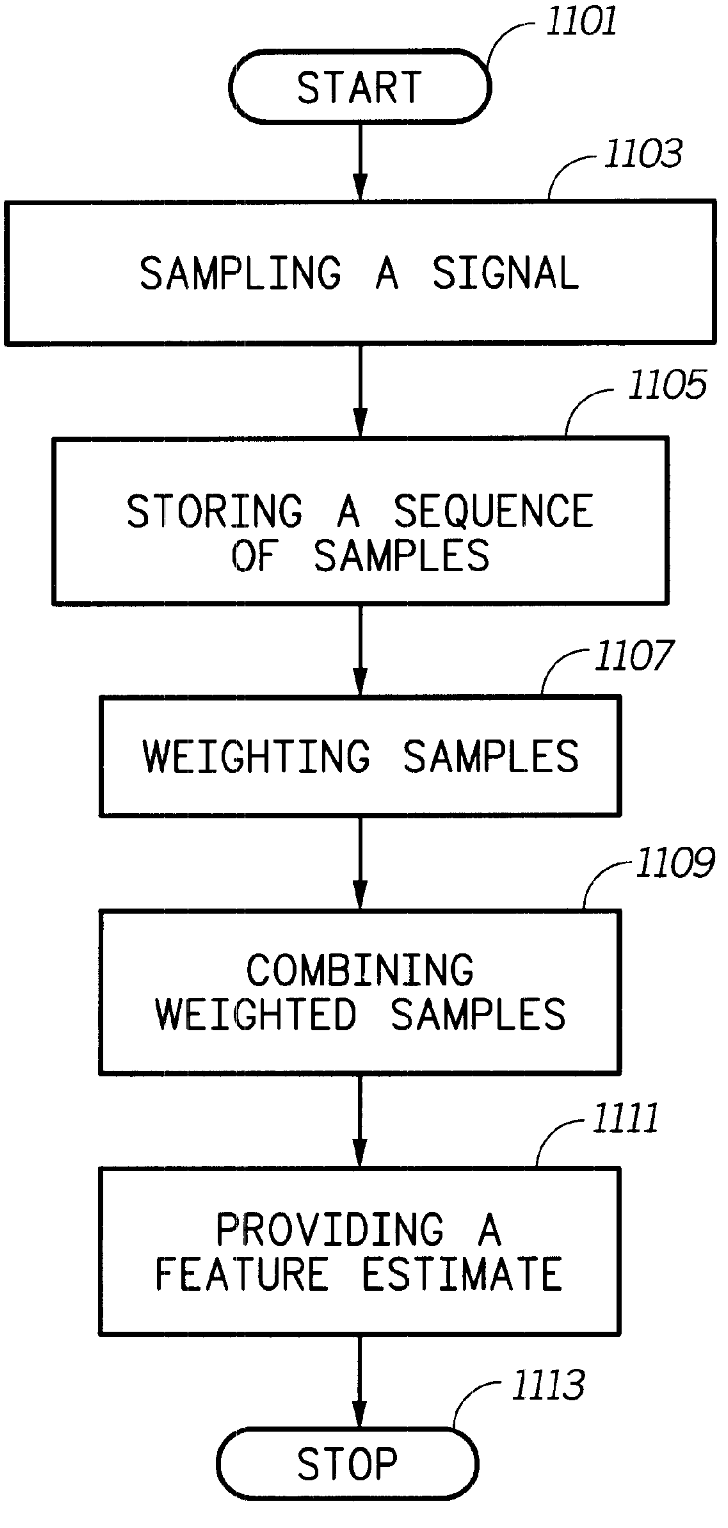
FIG. 11 is a flow chart of a preferred method of signal analysis in accordance with the instant invention.

Referring to FIG. 11 a method embodiment of the instant invention is set in a signal analyzer using short-time signal analysis to obtain a time variant feature from a signal and begins at step (1101). The method includes the step of sampling the signal (1103) to provide a sequence of samples of a portion of the signal and, preferably, storing the sequence of samples of a portion of the signal at step (1105). The samples or sequence of samples are then weighted in accordance with or in proportion to, alternatively, a half-sign, cosine, 2nd order complex pole, or 3rd order complex pole function or window, as above defined, to provide weighted samples at step (1107).

Thereafter the method combines the weighted samples at step (1109) to provide a signal feature or feature estimate for the signal or relevant portion thereof at step (1111) and thereafter ends at step (1113). The signal feature can be proportional to a signal average for the signal or portion of the signal in accordance with the equations for $S_{avg}(n)$ as explained above. Alternatively or additionally the method, step of combining, can provide a frequency dependent energy estimate for the signal or portion thereof in accordance with the equations above for $F_d(n|\omega)$).

It will be appreciated by those of ordinary skill in the art that the apparatus and methods disclosed provide various approaches for analyzing a signal without compromising the accuracy of such analysis, thus data communications integrity, or otherwise unnecessarily burdening processing resources. These inventive structures and methods may be readily and advantageously employed in a wireless system, paging receiver or other communications device or system to provide accurate and computationally efficient demodulators or other signal analyzers. Hence, the present invention, in furtherance of satisfying a long-felt need of wireless communications, readily facilitates, for example, portable receivers by providing methods and apparatus for signal analysis that are practical to implement from a physical, economic and power source perspective in for example a portable product, such as a pager.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A signal analyzer using short-time signal analysis to obtain a time variant feature from a signal, the signal analyzer comprising in combination:

an input register for storing a sequence of samples of a portion of said signal, a multiplier for weighting in accordance with a half-sine function said sequence of samples to provide weighted samples of said portion of said signal, and a combiner for combining said weighted samples to provide a time variant signal feature estimate for said portion of said signal.

2. The signal analyzer of claim 1 wherein said multiplier weights said sequence of samples in proportion to a half sine function defined as $$\left\{\begin{array}{ll} \frac{\sin([n+1]\pi/N}{\sin\pi/N}, & n=0,1,\ldots N-2 \\ 0, & \text{otherwise} \end{array}\right\}$$

where said sequence of samples is N−1 samples.

3. The signal analyzer of claim 1 wherein said combiner provides said signal feature estimate proportional to a signal average for said weighted samples.

4. The signal analyzer of claim 3 wherein said combiner provides said signal average at sample n in proportion to:

$$S_{avg}(n)=2\cos(\pi/N)S_{avg}(n-1)-S_{avg}(n-2)+d(n)+d(n-N),$$

where d(n) and d(n−N) are, respectively, a sample at n and n−N and $S_{avg}$(n−1) and $S_{avg}$(n−2) are, respectively, previous signal averages at sample n−1 and n−2.

5. The signal analyzer of claim 1 wherein said combiner provides a frequency dependent energy estimate for said portion of said signal.

6. The signal analyzer of claim 5 wherein said combiner provides said frequency dependent energy estimate at sample n, in proportion to:

$$F_d(n|\omega)=2e^{-j\omega}\cos(\pi/N)F_d(n-1|\omega)-e^{-j2\omega}F_d(n-2|\omega)+d(n)+e^{-jN\omega}d(n-N),$$

where d(n) and d(n−N) are, respectively, a sample at n and n−N and $F_d$(n−1|ω) and $F_d$(n−2|ω) are, respectively, frequency dependent energy estimates at sample n−1 and n−2.

7. A signal analyzer using short-time signal analysis to obtain a time variant feature from a signal, the signal analyzer comprising in combination:

a signal sampler for sampling the signal to provide a sequence of samples of the signal, a multiplier for weighting in accordance with a 2nd order complex pole function said sequence of samples to provide weighted samples, and a combiner for combining said weighted samples to provide a time variant signal feature estimate for said signal.

8. The signal analyzer of claim 7 wherein said multiplier weights said sequence of samples in proportion to a complex pole function defined as $$\left\{\frac{\sin([n+1]\theta)}{\sin\theta}r^n, \quad n=0,1,2\ \ldots\right\},$$

$$\text{where } r\propto e^{\left(\frac{\theta \ln R_2}{\pi}\right)}, \quad \text{and } \theta\propto\frac{\tan^{-1}\left(\frac{-\pi}{\ln R_2}\right)}{lp+1}.$$

9. The signal analyzer of claim 7 wherein said combiner provides said signal feature proportional to a signal average for said weighted samples.

10. The signal analyzer of claim 9 wherein said combiner provides said signal average at sample n in proportion to:

$$S_{avg}(n)=2r\cos\theta S_{avg}(n-1)-r^2S_{avg}(n-2)+d(n),$$

where d(n) is a sample at n and $S_{avg}$(n−1) and $S_{avg}$(n−2) are, respectively, previous signal averages at sample n−1 and n−2.

11. The signal analyzer of claim 7 wherein said combiner provides a frequency dependent energy estimate for said weighted samples.

12. The signal analyzer of claim 11 wherein said combiner provides said frequency dependent energy estimate at sample n, in proportion to:

$$F_d(n|\omega)=2re^{-j\omega}\cos\theta F_d(n-1|\omega)-r^2e^{-j2\omega}F_d(n-2|\omega)+d(n),$$

where d(n) is a sample at n and $F_d$(n−1|ω) and $F_d$(n−2|ω) are, respectively, previous frequency dependent energy estimates at sample n−1 and n−2.

13. A signal analyzer using short time signal analysis to obtain a time varying feature from a signal, the analyzer comprising in combination:

an input register for storing a sequence of samples of a portion of the signal, a multiplier for weighting in accordance with a cosine-wave function said sequence of samples to provide weighted samples of said portion of said signal, and a combiner for combining said weighted samples to provide a time varying signal feature estimate for said portion of said signal.

14. The signal analyzer of claim 13 wherein said multiplier weights said sequence of samples in proportion to a cosine-wave function defined as $$\left\{\begin{array}{ll} \frac{\cos(\pi/N)-\cos[(2n+3)\pi/N]}{2[1-\cos2\pi/N]\cos\pi/N}, & n=0,1,\ldots,N-3 \\ 0, & \text{otherwise} \end{array}\right\}$$

where said sequence of samples is N−2 samples.

15. The signal analyzer of claim 13 wherein said combiner provides said signal feature estimate proportional to a signal average of said weighted samples.

16. The signal analyzer of claim 15 wherein said combiner provides said signal average at sample n in proportion to:

$$S_{avg}(n)=(1+\cos 2\pi/N)[S_{avg}(n-1)-S_{avg}(n-2)]+S_{avg}(n-3)+d(n)-d(n-N)$$

where d(n) and d(n−N) are, respectively, a sample at n and n−N and $S_{avg}$(n−1), $S_{avg}$(n−2) and $S_{avg}$(n−3) are, respectively, previous signal averages at sample n−1, n−2, and n−3.

17. The signal analyzer of claim 13 wherein said combiner provides a frequency dependent energy estimate for said portion of said signal.

18. The signal analyzer of claim 16 wherein said combiner provides said feature estimate at sample n in proportion to:

$$F_d(n \mid \omega) = e^{-j\omega}\left[1 + 2\cos\frac{2\pi}{N}\right]F_d(n-1 \mid \omega) - e^{-j2\omega}\left[1 + 2\cos\frac{2\pi}{N}\right]F_d(n-2 \mid \omega) + e^{-j3\omega}F_d(n-3 \mid \omega) + d(n) - e^{-jN\omega}d(n-N)$$

where d(n) and d(n−N) are, respectively, a sample at n and n−N and $F_d(n-1|\omega)$, $F_d(n-2|\omega)$, and $F_d(n-3|\omega)$ are, respectively, previous frequency dependent energy estimates at sample n−1, n−2, and n−3.

19. A signal analyzer using short-time signal analysis to obtain a time variant feature from a signal, the signal analyzer comprising in combination:

a signal sampler for sampling the signal to provide a sequence of samples of said signal a multiplier for weighting in accordance with a 3rd-order complex pole function said sequence of samples to provide weighted samples of said signal, and a combiner for combining said weighted samples to provide a time variant signal feature estimate for said weighted samples of said signal.

20. The signal analyzer of claim 19 wherein said multiplier weights said sequence of samples in proportion to a complex pole function defined as $$\left\{\frac{\left(\cos\frac{\pi}{N} - \cos[(2n+3)\pi/N]\right\}}{\cos\frac{\pi}{N}\left(2 - 2\cos 2\frac{\pi}{N}\right)}r^n, \quad n = 0, 1, 2, \ldots\right\}, \text{ where } r \propto \exp\left(\frac{\ln R}{N}\right).$$

21. The signal analyzer of claim 19 wherein said combiner provides said signal feature estimate proportional to a signal average for said weighted samples.

22. The signal analyzer of claim 21 wherein said combiner provides said signal average at sample n in proportion to:

$$S_{avg}(n)=r(1+2\cos 2\pi/N)S_{avg}(n-1)-r^2(1+2\cos 2\pi/N)S_{avg}(n-2)+r^3S_{avg}(n-3)+d(n)$$

where d(n) is a sample of said signal at n, $S_{avg}(n-1)$, $S_{avg}(n-2)$, and $S_{avg}(n-3)$ are, respectively, previous signal averages at sample n−1, n−2, and n−3.

23. The signal analyzer of claim 19 wherein said combiner provides a frequency dependent energy estimate for said weighted samples.

24. The signal analyzer of claim 23 wherein said combiner provides said frequency dependent energy estimate at sample n, in proportion to:

$$F_d(n|\omega)=r(1+2\cos 2\pi/N)e^{-j\omega}F_d(n-1|\omega)-r^2(1+2\cos 2\pi/N)e^{-j2\omega}F_d(n-2|\omega)+r^3e^{-j3\omega}F_d(n-3|\omega)+d(n)$$

where d(n) is a sample at n and $F_d(n-1|\omega)$, $F_d(n-2|\omega)$, and $F_d(n-3|\omega)$ are, respectively, frequency dependent energy estimates at sample n−1, n−2, and n−3.

25. A signal analyzer using recursive short time signal analysis to obtain a time varying feature from a signal, the analyzer comprising in combination:

a signal sampler for sampling the signal to provide a sequence of samples of the signal, and a combiner for combining a first signal, a second signal, a first previous estimate of the time varying feature, and a second previous estimate of the time varying feature to provide a current time varying feature estimate, said first signal and said second signal, respectively, corresponding to a first sample and a second sample from said sequence of samples of the signal, said second sample spaced by at least one sample from said first sample, said first previous estimate of the time varying feature weighted by a cosine function having an argument inversely proportional to a number of samples equal to a sum of said at least one sample, said first sample and said second sample.

26. The signal analyzer of claim 25 wherein said combiner provides said feature estimate proportional to a signal average for a portion of said signal.

27. The signal analyzer of claim 26 wherein said combiner provides said feature estimate at sample n in proportion to:

$$S_{avg}(n)=2\cos(\pi/N)S_{avg}(n-1)-S_{avg}(n-2)+d(n)+d(n-N),$$

where d(n) and d(n−N) are, respectively, said first sample taken at n and said second sample taken at n−N and $S_{avg}(n-1)$ and $S_{avg}(n-2)$ are, respectively, said first previous estimate at sample n−1 and said second previous estimate sample n−2.

28. The signal analyzer of claim 26 wherein said combiner additionally combines a third previous estimate as well as said second previous estimate weighted by said cosine function.

29. The signal analyzer of claim 28 wherein said combiner provides said feature estimate at sample n in proportion to:

$$S_{avg}(n)=(1+2\cos 2\pi/N)(S_{avg}(n-1)-S_{avg}(n-2))+S_{avg}(n-3)+d(n)-d(n-N),$$

where d(n) and d(n−N) are, respectively, said first sample taken at n and said second sample taken at n−N and $S_{avg}(n-1)$, $S_{avg}(n-2)$, and $S_{avg}(n-3)$ are, respectively, said first previous estimate at sample n−1, said second previous estimate at sample n−2, and said third previous estimate at sample n−3.

30. The signal analyzer of claim 25 wherein said combiner provides said feature estimate proportional to a frequency dependent energy estimate for a portion of said signal.

31. The signal analyzer of claim 30 wherein said combiner provides said feature estimate at sample n in proportion to:

$$F_d(n|\omega))=2e^{-j\omega}\cos(\pi/N)F_d(n-1|\omega)-e^{-j2\omega}F_d(n-2|\omega)+d(n)+e^{-jN\omega}d(n-N),$$

where d(n) and d(n−N) are, respectively, a sample at n and n−N and $F_d(n-1|\omega)$ and $F_d(n-2|\omega)$ are, respectively, previous frequency dependent energy estimates at sample n−1 and n−2.

32. The signal analyzer of claim 30 wherein said combiner additionally combines a third previous estimate as well as said second previous estimate weighted by said cosine function.

33. The signal analyzer of claim 32 wherein said combiner provides said feature estimate at sample n in proportion to:

$$F_d(n|\omega)=e^{-j\omega}(1+2\cos 2\pi/N)F_d(n-1|\omega)-e^{-j2\omega}(1+2\cos 2\pi/N)F_d(n-2|\omega)+e^{-j3\omega}F_d(n-3|\omega)+d(n)-e^{-jN\omega}d(n-N),$$

where d(n) and d(n−N) are, respectively, a sample at n and n−N and $F_d(n-1|\omega)$, $F_d(n-2|\omega)$ and $F_d(n-3|\omega)$ are, respectively, frequency dependent energy estimates at sample n−1, n−2, and n−3.

34. A signal analyzer using recursive short time signal analysis to obtain a time varying feature from a signal, the analyzer comprising in combination:

a signal sampler for sampling the signal to provide a sequence of samples of the signal, a combiner for combining a first signal corresponding to a first sample, a first previous estimate of the time varying feature weighted by a cosine function having an argument inversely proportional to a number of said sequence of samples, and a second previous estimate of the time varying feature exponentially weighted in proportion to said argument to provide a current time varying feature estimate.

35. The signal analyzer of claim 34 wherein said combiner provides said feature estimate proportional to a signal average for a portion of said signal.

36. The signal analyzer of claim 35 wherein said combiner provides said feature estimate at sample n in proportion to:

$$S_{avg}(n)=2r\cos\theta(S_{avg}(n-1))-r^2S_{avg}(n-2)+d(n),$$

where d(n) is said first sample taken at n, $S_{avg}(n-1)$ and $S_{avg}(n-2)$ are, respectively, said first previous estimate at sample n−1 and said second previous estimate at sample n−2, $$r\propto e^{\left(\frac{\theta \ln R_2}{\pi}\right)},\ \text{and}\ \theta\propto\frac{\tan^{-1}\left(\frac{-\pi}{\ln R_2}\right)}{lp+1}.$$

37. The signal analyzer of claim 35 wherein said combiner additionally combines a third previous estimate exponentially weighted as well as said second previous estimate weighted by said cosine function.

38. The signal analyzer of claim 37 wherein said combiner provides said feature estimate at sample n in proportion to:

$$S_{avg}(n)=(1+2\cos\theta)(rS_{avg}(n-1)-r^2S_{avg}(n-2))+r^3S_{avg}(n-3)+d(n),$$

where d(n) is said first sample taken at n, $S_{avg}(n-1)$, $S_{avg}(n-2)$, and $S_{avg}(n-3)$ are, respectively, said first previous estimate at sample n−1, said second previous estimate at sample n−2, and said third previous estimate at sample n−3, $$r\propto e^{\left(\frac{\theta \ln R_3}{2\pi}\right)},\ \text{and}\ \theta\propto\frac{2\pi}{N}.$$

39. The signal analyzer of claim 34 wherein said combiner provides said feature estimate proportional to a frequency dependent energy estimate for a portion of said signal.

40. The signal analyzer of claim 39 wherein said combiner provides said feature estimate at sample n in proportion to:

$$F_d(n|\omega)=2re^{-j\omega}\cos(\theta)F_d(n-1|\omega)-r^2e^{-j2\omega}F_d(n-2|\omega)+d(n),$$

where d(n) is said first sample taken at n, $F_d(n-1|\omega)$ and $F_d(n-2|\omega)$ are, respectively, frequency dependent energy estimates at sample n−1 and n−2, $$r\propto e^{\left(\frac{\theta \ln R_2}{\pi}\right)},\ \text{and}\ \theta\propto\frac{\tan^{-1}\left(\frac{-\pi}{\ln R_2}\right)}{lp+1}.$$

41. The signal analyzer of claim 39 wherein said combiner additionally combines a third previous estimate exponentially weighted as well as said second previous estimate weighted by said cosine function.

42. The signal analyzer of claim 41 wherein said combiner provides said feature estimate at sample n in proportion to:

$$F_d(n|\omega)=re^{-j\omega}(1+2\cos(\theta))F_d(n-1|\omega)-r^2e^{-j2\omega}(1+2\cos(\theta))F_d(n-2|\omega)+r^3e^{-j3\omega}F_d(n-3|\omega)+d(n),$$

where d(n) is said first sample taken at n, $F_d(n-1|\omega)$, $F_d(n-2|\omega)$, and $F_d(n-3|\omega)$ are, respectively, frequency dependent energy estimates at sample n−1, n−2, and n−3, $$r\propto e^{\left(\frac{\theta \ln R_3}{2\pi}\right)},\ \text{and}\ \theta\propto\frac{2\pi}{N}.$$

43. In a signal analyzer using recursive short-time signal analysis a method of obtaining a time variant feature from a signal, the method including the steps of:

storing a sequence of samples of a portion of the signal, weighting in accordance with a half-sine function said sequence of samples to provide weighted samples, and combining said weighted samples to provide a time variant signal feature for said portion of said signal.

44. The method of claim 43 wherein said step of weighting is in proportion to a half sine function defined as $$\left\{\begin{array}{ll}\frac{\sin([n+1]\pi/N)}{\sin\pi/N}, & n=0,1,\ldots N-2\\ 0, & \text{otherwise}\end{array}\right\}$$

where said sequence of samples is N−1 samples.

45. The method of claim 43 wherein said step of combining provides said signal feature in proportion to a signal average for said portion of said signal.

46. The method of claim 45 wherein said step of combining provides said signal average at sample n in proportion to:

$$S_{avg}(n)=2\cos(\pi/N)S_{avg}(n-1)-S_{avg}(n-2)+d(n)+d(n-N),$$

where d(n) and d(n−N) are, respectively, a sample at n and n−N and $S_{avg}(n-1)$ and $S_{avg}(n-2)$ are, respectively, previous signal averages at sample n−1 and n−2.

47. The method of claim 43 wherein said step of combining provides a frequency dependent energy estimate for said portion of said signal.

48. The method of claim 47 wherein said step of combining provides said frequency dependent energy estimate at sample n, in proportion to:

$$F_d(n|\omega)=2e^{-j\omega}\cos(\pi/N)F_d(n-1|\omega)-e^{-j2\omega}F_d(n-2|\omega)+d(n)+e^{-jN\omega}d(n-N),$$

where d(n) and d(n−N) are, respectively, a sample at n and n−N and $F_d(n-1|\omega)$ and $F_d(n-2|\omega)$ are, respectively, frequency dependent energy estimates at sample n−1 and n−2.

49. In a signal analyzer using recursive short-time signal analysis, a method of obtaining a time variant feature from a signal, the method including the steps of:

sampling the signal to provide a sequence of samples of a portion of the signal, weighting in accordance with a complex pole function said sequence of samples to provide weighted samples, and combining said weighted samples to provide a time variant signal feature for said portion of said signal.

50. The method of claim 49 wherein said step of weighting said sequence of samples is in proportion to a complex pole function defined defined as $$\left\{\frac{\sin([n+1]\theta)}{\sin\theta}r^n, \quad n=0,1,2\ \ldots\right\}.$$

51. The method of claim 49 wherein said step of combining provides said signal feature proportional to a signal average for said portion of said signal.

52. The method of claim 51 wherein said step of combining provides said signal average at sample n in proportion to:

$$S_{avg}(n)=2r\cos\theta(S_{avg}(n-1))-r^2S_{avg}(n-2)+d(n),$$

where d(n) is a sample at n and $S_{avg}(n-1)$ and $S_{avg}(n-2)$ are, respectively, previous signal averages at sample n−1 and n−2.

53. The method of claim 49 wherein said step of combining provides a frequency dependent energy estimate for said portion of said signal.

54. The method of claim 53 wherein said step of combining provides said frequency dependent energy estimate at sample n, in proportion to:

$$F_d(n|\omega)=2re^{-j\omega}\cos\theta F_d(n-1|\omega)-r^2e^{-j2\omega}F_d(n-2|\omega)+d(n),$$

where d(n) is a sample at n and $F_d(n-1|\omega)$ and $F_d(n-2|\omega)$ are, respectively, frequency dependent energy estimates at sample n−1 and n−2.

* * * * *